(12) United States Patent
Wyatt

(10) Patent No.: US 8,558,839 B1
(45) Date of Patent: Oct. 15, 2013

(54) DISPLAYING CRITICAL SYSTEM SCREENS IN A MULTIPLE GRAPHICS ADAPTER ENVIRONMENT

(75) Inventor: David Wyatt, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 894 days.

(21) Appl. No.: 12/509,172

(22) Filed: Jul. 24, 2009

(51) Int. Cl.
 G06F 15/00 (2006.01)
 G06F 15/16 (2006.01)
 G06F 15/80 (2006.01)

(52) U.S. Cl.
 USPC ........... 345/502; 345/501; 345/503; 345/504; 345/505

(58) Field of Classification Search
 USPC ................................................. 345/501–505
 See application file for complete search history.

(56) References Cited

U.S. PATENT DOCUMENTS 5,848,294 A * 12/1998 Clark ............................... 710/36
2009/0153540 A1* 6/2009 Blinzer et al. ................. 345/212

* cited by examiner

Primary Examiner — Hau Nguyen
(74) Attorney, Agent, or Firm — Patterson & Sheridan, L.L.P.

(57) ABSTRACT

A system and method force a display device to receive the output produced by a graphics processing unit that is configured as the video graphics array (VGA) boot device for display of critical system screens. A hybrid computer system that includes multiple graphics processors configures a display multiplexor to select image data from one of the multiple graphics processing units for output to the display device. When a critical system event occurs and the graphics processing unit that is selected is not configured as the VGA boot device, system basic input/output system (BIOS) interfaces are used to configure the multiplexor to select the one graphics processing unit that is configured as the VGA boot device to output the critical system screen to the display device.

20 Claims, 3 Drawing Sheets

DISPLAYING CRITICAL SYSTEM SCREENS IN A MULTIPLE GRAPHICS ADAPTER ENVIRONMENT

FIELD OF THE INVENTION

Embodiments of the present invention relate generally to displaying critical system screens in a system that includes multiple graphics adapters, and more specifically to forcing a display device to receive the output produced by a graphics processing unit that is configured as the only VGA device in the system for display of critical system screens.

DESCRIPTION OF THE RELATED ART

Recently, some computing systems include two graphics processing units (GPUs) that may output image data to a single display device. Critical system screens, such as post boot screens, pre-OS boot screens, and critical operating system messages including the "blue screen of death" are displayed on the display device through the GPU that is configured as the video graphics array (VGA) device. Using the VGA functions to display these critical system screens is necessary since the software, operating system, drivers, and hardware components may be unstable. The VGA display controller is directly access through VGA hardware registers, bypassing other graphics functionality, to ensure that the critical system screen is conveyed on the display device.

Only a single GPU in a multiple GPU system is allowed to be the VGA device, and the VGA device cannot be changed from one GPU to another on-the-fly, i.e., without rebooting the system. The location of the VGA basic input/output system (BIOS) in memory is constrained by the International Business Machines (IBM) legacy memory definition and I/O resources, so only a single GPU device can have control of the VGA functions once the system is booted.

When two or more GPUs are present in the system, the GPU that is controlling the display device can be switched on-the-fly. At boot time, one of the two GPUs is designated as the VGA boot device. Unlike control of the display, control of the VGA cannot be switched on-the-fly. It is possible to designate a first GPU as the VGA boot device and the display output device, boot the system, and then change the display output device from the first GPU to a second GPU. If a critical system screen event occurs it is no longer possible to display the critical system screen since the second GPU that is the display output device is not the VGA boot device. Once the critical system event occurs it is also not possible to switch the display output device cannot be displayed.

Accordingly, what is needed in the art is a system and method for displaying critical system screens in a system that includes multiple graphics adapters.

SUMMARY OF THE INVENTION

A system and method force a display device to receive the output produced by a graphics processing unit that is configured as the VGA boot device for display of critical system screens. The critical system screens are displayed even when a different graphics processing unit that is not configured as the VGA boot device provided image data to the display device.

Various embodiments of a method of the invention display critical system screens on a display device of a computer system that includes multiple graphics processing units. The method includes configuring only a first graphics processing unit of the multiple graphics processing units as a video graphics array (VGA) boot device and receiving a notification that a critical system event has occurred. a system basic input/output system (BIOS) interface is called to configure a display multiplexor to provide image data from the first graphics processing unit to the display device and the critical system screen is output to the display device of the computer system through the first graphics processing unit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
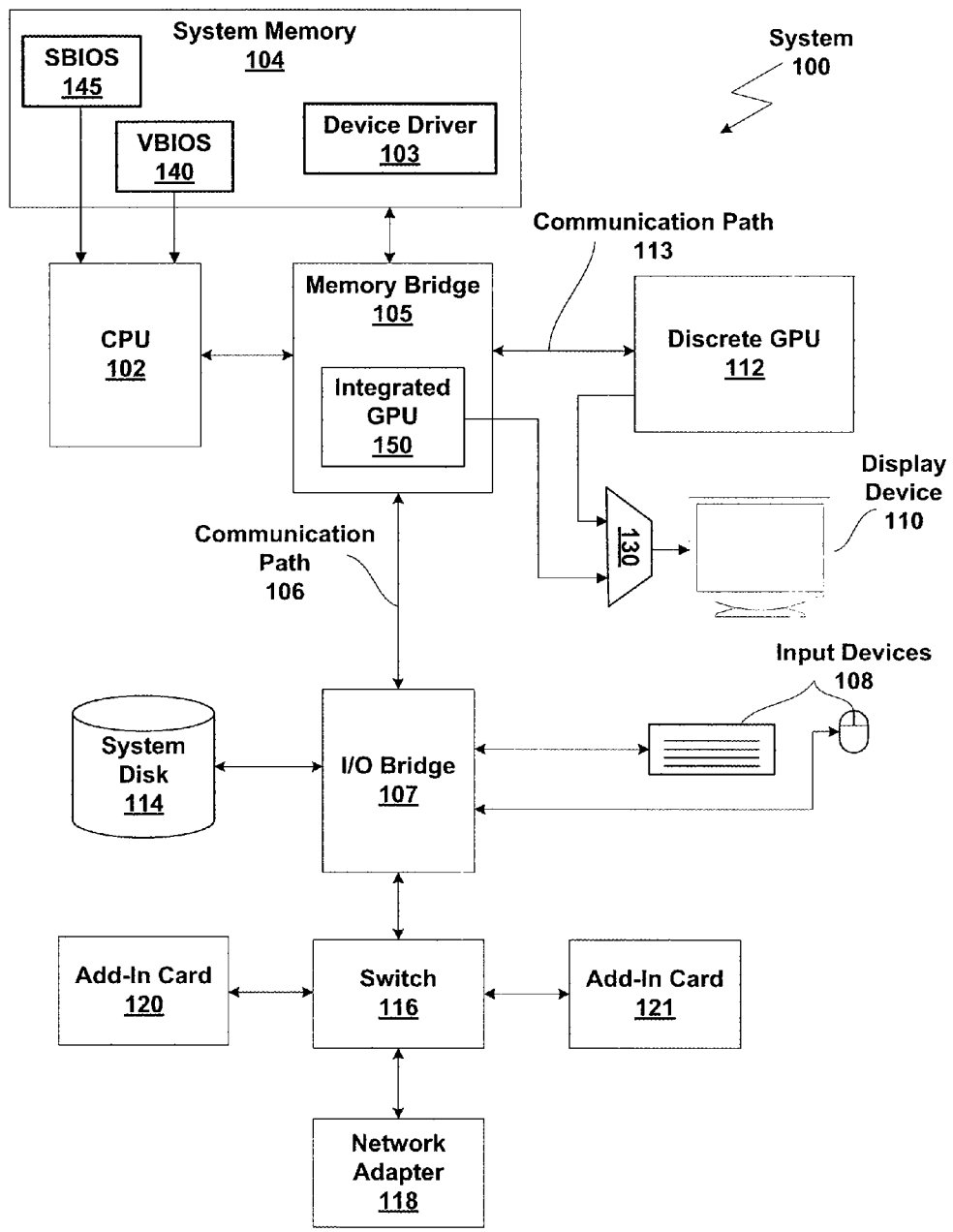
FIG. 1 is a block diagram illustrating a computer system configured to implement one or more aspects of the present invention.

FIG. 1 is a block diagram of a computer system 100 according to an embodiment of the present invention. The computer system 100 includes a central processing unit (CPU) 102 and a system memory 104 communicating via a bus path that includes a memory bridge 105. The system memory 104 represents storage resources including random access memory (RAM) and read-only memory (ROM). The memory bridge 105, which may be, e.g., a Northbridge chip, is connected via a bus or other communication path 106 (e.g., a HyperTransport link) to an I/O (input/output) bridge 107. In some embodiments of the present invention, memory bridge 105 includes an integrated GPU 150 that is configured to execute graphics program instuctions, including, but not limited to geometry programs, vertex programs, and shader programs. In other embodiments of the present invention an integrated GPU 150 is included within the CPU 102.

An I/O bridge 107, which may be, e.g., a Southbridge chip, receives user input from one or more user input devices 108 (e.g., keyboard, mouse) and forwards the input to the CPU 102 via the communication path 106 and the memory bridge 105. A discrete GPU 112 is coupled to the memory bridge 105 via a bus or other communication path 113 (e.g., a PCI Express, Accelerated Graphics Port, or HyperTransport link); in one embodiment the discrete GPU 112 is a graphics subsystem, including local graphics memory storage resources, that delivers pixels to a display device 110 (e.g., a conventional CRT or LCD based monitor). In other embodiments of the present invention, the discrete GPU 112 is a graphics processing unit that does not include local graphics memory and uses system memory 104.

The discrete GPU 112 may include any amount of local graphics memory, including no local memory, and may use local memory and system memory in any combination. For instance, the discrete GPU 112 and the integrated GPU 150 can be graphics processing units in a unified memory architecture (UMA) embodiment; in such embodiments, little or no dedicated graphics memory is provided, and the integrated GPU 150 and/or the discrete GPU 112 would use the system memory 104 exclusively or almost exclusively. Typically, the discrete GPU 112 is a higher performance device compared with the capabilities of the integrated GPU 150, producing higher quality images and/or supporting a richer feature set. A device driver 103 that is stored in the system memory 104, interfaces between processes executed by the CPU 102, such as application programs, and the discrete GPU 112 and/or the integrated GPU 150, translating program instructions as needed for execution by the discrete GPU 112 and the integrated GPU 150.

A system BIOS, SBIOS 145 performs conventional functions of recognizing and initializing hardware and performing bootup operations. A video BIOS, VBIOS 140 performs conventional functions of recognizing and initializing graphics hardware. The SBIOS 145 and VBIOS 140 may be implemented as firmware that is encoded in a PROM (programmable read only memory), embedded code stored within the CPU 102 or the memory bridge 105, or using other techniques known to those skilled in the art. In addition to performing conventional functions, the SBIOS 145 and VBIOS 140 are runtime executed code that interface with each other when a critical system event occurs in order to ensure that the critical system screen is displayed.

A system disk 114 is also connected to the I/O bridge 107. A switch 116 provides connections between the I/O bridge 107 and other components such as a network adapter 118 and various add-in cards 120 and 121. One or more of the add-in cards 120 and 121 may include the discrete CPUs 112. Other components (not explicitly shown), including USB or other port connections, CD drives, DVD drives, film recording devices, and the like, may also be connected to the I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In some embodiments, some or all of the integrated GPU 150 and the discrete GPU 112 are graphics processors with rendering pipelines that can be configured to perform various tasks related to generating pixel data from graphics data supplied by the CPU 102 and/or the system memory 104 via the memory bridge 105 and the bus 113, interacting with local graphics memory or the system memory 104 (which can be used as graphics memory including, e.g., a conventional frame buffer) to store and update pixel data, delivering pixel data to the display device 110, and the like. In operation, the CPU 102 is the master processor of system 100, controlling and coordinating operations of other system components. In particular, the CPU 102 issues commands that control the operation of the integrated GPU 150 and the discrete GPU 112. Therefore, the integrated GPU 150 and the discrete GPU 112 may be configured to offload processing from the CPU 102 to increase the processing throughput and/or performance of the system 100.

A display multiplexor 130 is positions between the display device 110 and the integrated GPU 150 and the discrete GPU 112. The display multiplexor 130 is configured through writes to memory mapped registers to provide image data from only one of the GPUs (integrated GPU 150 or the discrete GPU 112) for output by the display device 110. The different GPUs may have different performance capabilities in terms of processing speed and/or processing features. Operating policies that control which of the GPUs is enabled for producing image data for output to the display device may be specified by an application program or a user of computer system 100 through a user interface. Operating policies may be used to maximize the length of time computer system 100 is powered by a battery, maximize graphics processing performance, minimize operating noise, minimize heat generation, and the like.

It will be appreciated that the system shown herein is illustrative and that variations and modifications are possible. The connection topology, including the number and arrangement of bridges, may be modified as desired. For instance, in some embodiments, the system memory 104 is connected to the CPU 102 directly rather than through a bridge, and other devices communicate with the system memory 104 via the memory bridge 105 and the CPU 102. In other alternative topologies, the discrete GPU 112 is connected to the I/O bridge 107 or directly to the CPU 102, rather than to the memory bridge 105. In still other embodiments, the I/O bridge 107 and the memory bridge 105 might be integrated into a single chip. The particular components shown herein are optional; for instance, any number of add-in cards or peripheral devices might be supported. In some embodiments, the switch 116 is eliminated, and the network adapter 118 and the add-in cards 120, 121 connect directly to the I/O bridge 107.

Any number of discrete GPUs 112 can be included in a system 100. For instance, multiple discrete GPUs 112 can be provided on a single add-in card, or multiple add-in cards can be connected to the communication path 113, or one or more integrated GPUs 150 could be integrated into a bridge chip. The discrete GPUs 112 in a multi-GPU system may be identical to or different from each other; for instance, different GPUs might have different numbers of cores, different amounts of local graphics memory, and so on. Where multiple discrete GPUs 112 are present, they may be operated in parallel to process data at higher throughput than is possible with a single discrete GPU 112. Systems incorporating one or more discrete GPUs 112 may be implemented in a variety of configurations and form factors, including desktop, laptop, or handheld personal computers, servers, workstations, game consoles, embedded systems, and the like.

Figure 2:
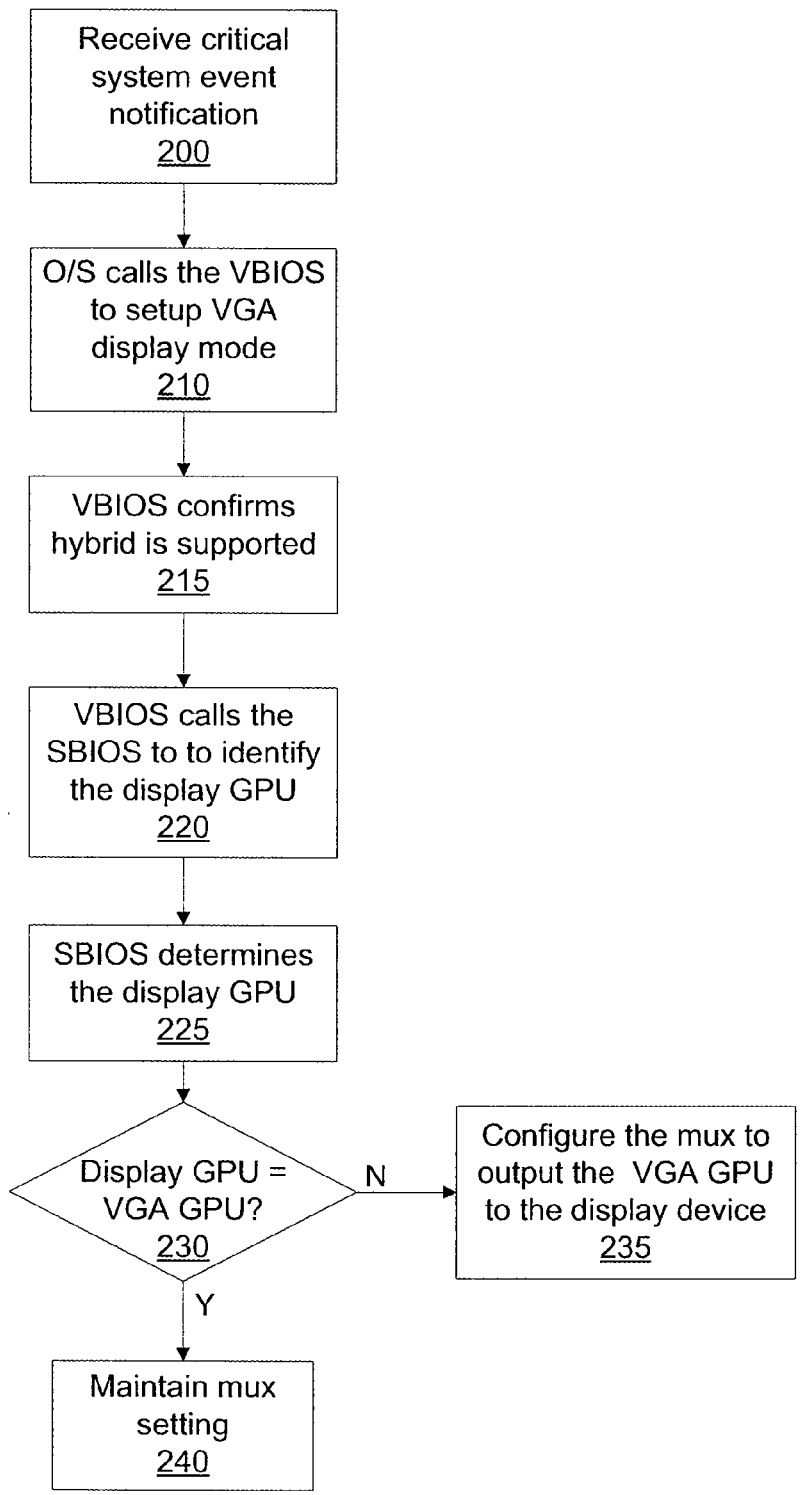
FIG. 2 is a flow diagram of method steps for forcing the display device in the computer system of FIG. 1 to receive the output produced by the GPU that is designated as the VGA boot device for display of critical system screens, in accordance with one or more aspects of the present invention.

FIG. 2 is a flow diagram of method steps for forcing the display device in the computer system 100 of FIG. 1 to receive the output produced by the GPU that is designated as the VGA boot device for display of critical system screens on the display device 110, in accordance with one or more aspects of the present invention. As previously explained, only one of the GPUs in the computer system 100, e.g., integrated GPU 150, discrete GPU 112, or another GPU, may be designated as the VGA boot device. Any one of the GPUs in the computer system 100, e.g., integrated GPU 150, discrete GPU 112, or another GPU, may be selected as the display GPU whose image data is output to the display device 110 via the display multiplexor 130 at a particular time. The display GPU may be changed on-the-fly, but the VGA boot device may only be changed at the time of a system reboot.

The method begins at step 200 where a critical system event notification is received by the operating system of computer system 100. The critical system event may require display of a critical system screen, such as a post boot screen, pre-OS boot screen, or critical operating system messages including the "blue screen of death." These critical system screens may only be displayed using the GPU that is designated as the VGA boot device. At step 210 the operating system calls the VBIOS 140 to set up the VGA display mode for display of the critical system screen.

At step 215 the VBIOS 140 confirms that the computer system 100 is configured as a hybrid GPU system, meaning that more than one GPU is present and enabled in the computer system 100. In some computer systems, sending a communication to the SBIOS 145 using the Int 15 interface for an unsupported interrupt may lock up the system. Therefore, the VBIOS 140 checks that the system is a hybrid GPU system before sending Int 15 communications associated with hybrid systems to the SBIOS 145.

The VBIOS 140 may not know which of the GPUs is configured as the display GPU. In order to determine which of the GPUs is selected by the display multiplexor 130 to provide image data to the display device 110, the VBIOS 140 communicates with the SBIOS 145 to identify which of the GPUs is the display GPU. At step 225 the SBIOS 145 determines which of the GPUs is the display GPU and provides that information to the VBIOS 140. At step 230 the VBIOS 140 determines if the GPU that is configured as the VGA boot device is also the display GPU, and, if so, then in step 240 the setting of the display multiplexor 130 is maintained (not changed). Otherwise, at step 235 the VBIOS 140 communicates with the SBIOS 145 through the Int 15 interface to issue a call that sets the display multiplexor 130 to output image data produced by the GPU that is configured as the VGA boot device to the display device 110. In other words, at step 235 the GPU that is configured as the VGA boot device is designated as the display GPU. In some embodiments, steps 220, 225, 230, and 240 are omitted and the VBIOS 140 simply communicates with the SBIOS 145 through the Int 15 interface to designate the GPU that is configured as the VGA boot device as the display GPU regardless of which GPU was the display GPU when the critical system event notification was received.

Figure 3:
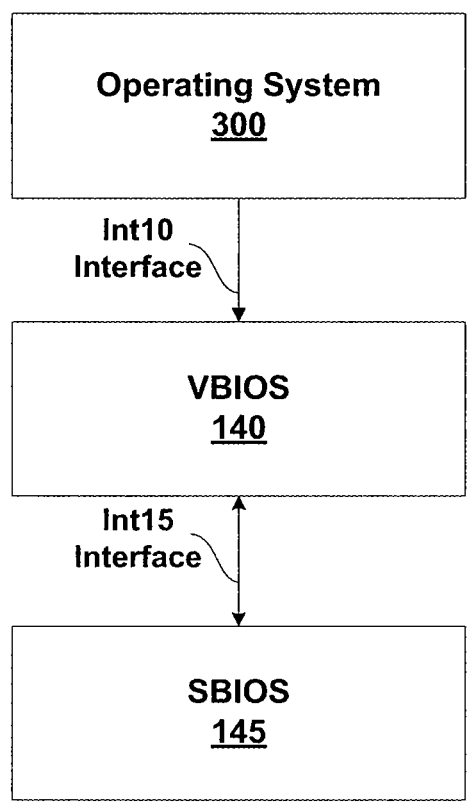
FIG. 3 is a conceptual diagram illustrating the interfaces between the operating system, SBIOS, and VBIOS, in accordance with one or more aspects of the present invention.

FIG. 3 is a conceptual diagram illustrating the interfaces between the operating system, SBIOS 145, and VBIOS 140, in accordance with one or more aspects of the present invention. The operating system communicates with the VBIOS 140 using Int 10 interfaces. In particular, the operating system sets up the VGA display mode for display of the critical system screens using the Int 10 interface. The VBIOS 140 communicates with the SBIOS 145 using Int 15 interfaces. For example, in step 215 a Function 0 callback function may be used by the VBIOS 140 to get information from the SBIOS 145 regarding the level of the hybrid software that the computer system 100 supports, and the support information for individual function. The VBIOS 140 may also issue a Function 5 callback function in step 220 to get information from the SBIOS 145 regarding whether or not hybrid mode is enable or disabled and the current setting of the display multiplexor 130. In step 235 the VBIOS 140 may issue a Function 3 callback function to control the setting of the display multiplexor 130 so that image data, and the critical system screen in particular, from the GPU that is configured as the VGA boot device is output by the display multiplexor 130 to the display device 110.

When a critical system event occurs and the GPU that is selected to provide image data to the display device is not configured as the VGA boot device, the VBIOS and SBIO interfaces are used to configure the multiplexor to select the GPU that is configured as the VGA boot device to output the critical system screen to the display device. Therefore the critical system screens are displayed in a computer system that includes multiple GPUs, regardless of which one of the GPUs is selected as the display GPU.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

The invention claimed is:

1. A method for displaying critical system screens on a display device of a computer system that includes multiple graphics processing units, comprising:
   configuring only a first graphics processing unit of the multiple graphics processing units as a video graphics array (VGA) boot device, wherein the multiple graphics processing units are selectively connectable to the display device via a display multiplexor;
   receiving a notification that a critical system event has occurred;
   calling to a system basic input/output system (BIOS) interface from a video BIOS to determine which graphics processing unit is providing image data to the display device in response to receiving the notification;
   calling to the system BIOS interface to configure the display multiplexor to provide image data from the first graphics processing unit to the display device in response to determining that the first graphics processing unit is not providing image data to the display device; and
   outputting the critical system screen to the display device of the computer system through the first graphics processing unit.

2. The method of claim 1, wherein calling to the system BIOS interface from the video BIOS includes determining which one of the multiple graphics processing units the display multiplexor is configured to provide image data from for output to the display device.

3. The method of claim 2, further comprising configuring the display multiplexor to provide image data from the first graphics processing unit to the display device when the display multiplexor is configured to provide image data from a second graphics processing unit of the multiple graphics processing units for output to the display device.

4. The method of claim 1, wherein the first graphics processing unit is integrated within a bridge device or a central processing unit.

5. The method of claim 1, wherein the first graphics processing unit is a discrete device.

6. The method of claim 1, further comprising, prior to the step of calling the system BIOS interface, confirming that the computer system includes at least two graphics processing units.

7. The method of claim 1, wherein the multiple graphics processing units include the first graphics processing unit that is integrated within a bridge device and a second graphics processing unit that is a discrete device.

8. The method of claim 1, further comprising:
confirming that the computer system includes multiple graphics processing units using a video BIOS; and
communicating to the video BIOS that the first graphics processing unit is not providing image data to the display device.

9. A computer-readable storage medium containing a program which, when executed by a computing device configures a computer system that includes multiple graphics processing units to perform a process to display critical system screens on a display device of the computer system, the process comprising:
configuring only a first graphics processing unit of the multiple graphics processing units as a video graphics array (VGA) boot device, wherein the multiple graphics processing units are selectively connectable to the display device via a display multiplexor;
receiving a notification that a critical system event has occurred;
calling to a system basic input/output system (BIOS) interface from a video BIOS to determine which graphics processing unit is providing image data to the display device in response to receiving the notification;
calling to the system BIOS interface to configure a display multiplexor to provide image data from the first graphics processing unit to the display device in response to determining that the first graphics processing unit is not providing image data to the display device; and
outputting the critical system screen to the display device of the computer system through the first graphics processing unit.

10. The computer-readable storage medium of claim 9, wherein calling to the system BIOS interface from the video BIOS includes determining which one of the multiple graphics processing units the display multiplexor is configured to provide image data from for output to the display device.

11. The computer-readable storage medium of claim 9, further comprising configuring the display multiplexor to provide image data from the first graphics processing unit to the display device when the display multiplexor is configured to provide image data from a second graphics processing unit of the multiple graphics processing units for output to the display device.

12. The computer-readable storage medium of claim 9, wherein the first graphics processing unit is integrated within a bridge device or a central processing unit.

13. The computer-readable storage medium of claim 9, wherein the first graphics processing unit is a discrete device.

14. The computer-readable storage medium of claim 9, further comprising, prior to the step of calling the system BIOS interface, confirming that the computer system includes at least two graphics processing units.

15. The computer-readable storage medium of claim 9, further comprising:
confirming that the computer system includes multiple graphics processing units using a video BIOS; and
communicating to the video BIOS that the first graphics processing unit is not providing image data to the display device.

16. A computer system, comprising:
a first graphics processing unit;
a second graphics processing unit;
a display device; and
a display multiplexor coupled between the display device and the first graphics processing unit and the second graphics processing unit to provide image data from either the first graphics processing unit or the second graphics processing unit to the display device;
a central processing unit; and
a memory containing a program, which, when executed on the processor is configured to perform an operation to display critical system screens on the display device, the operation comprising:
configuring only the first graphics processing unit as a video graphics array (VGA) boot device;
receiving a notification that a critical system event has occurred;
calling to a system basic input/output system (BIOS) interface from a video BIOS to determine which graphics processing unit is providing image data to the display device in response to receiving the notification;
calling to the system BIOS interface to configure the display multiplexor to provide image data from the first graphics processing unit to the display device in response to determining that the first graphics processing unit is not providing image data to the display device; and
outputting the critical system screen to the display device through the first graphics processing unit.

17. The computer system of claim 16, wherein calling to the system BIOS interface from the video BIOS includes determining if the display multiplexor is configured to provide image data from the second graphics processing unit for output to the display device.

18. The computer system of claim 17, further comprising configuring the display multiplexor to provide image data from the first graphics processing unit to the display device when the display multiplexor is configured to provide image data from the second graphics processing unit for output to the display device.

19. The computer system of claim 16, wherein the first graphics processing unit is integrated within the central processing unit or a bridge device that is coupled between the memory and the central processing unit and the second graphics processing unit is a discrete device.

20. The computer system of claim 16, wherein the second graphics processing unit is integrated within the central processing unit or a bridge device that is coupled between the memory and the central processing unit and the first graphics processing unit is a discrete device.

* * * * *